United States Patent
Asaoka et al.

(10) Patent No.: US 10,800,255 B2
(45) Date of Patent: Oct. 13, 2020

(54) AUTOMATIC TRANSMISSION

(71) Applicant: TOYOTA JIDOSHA KABUSHIKI KAISHA, Toyota-shi, Aichi-ken (JP)

(72) Inventors: Hironori Asaoka, Numazu (JP); Naoyuki Kishimoto, Susono (JP)

(73) Assignee: TOYOTA JISOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/287,173

(22) Filed: Feb. 27, 2019

(65) Prior Publication Data

US 2019/0283576 A1    Sep. 19, 2019

(30) Foreign Application Priority Data

Mar. 15, 2018 (JP) .................. 2018-048478

(51) Int. Cl.
| | |
|---|---|
| *F16H 37/04* | (2006.01) |
| *B60K 17/28* | (2006.01) |
| *B60K 25/06* | (2006.01) |
| *F16H 3/66* | (2006.01) |
| *B60K 25/02* | (2006.01) |

(52) U.S. Cl.
CPC .............. *B60K 17/28* (2013.01); *B60K 25/06* (2013.01); *F16H 3/666* (2013.01); *F16H 37/042* (2013.01); *B60K 2025/024* (2013.01); *F16H 2200/006* (2013.01); *F16H 2200/2012* (2013.01); *F16H 2200/2046* (2013.01); *F16H 2200/2064* (2013.01); *F16H 2306/40* (2013.01)

(58) Field of Classification Search
None
See application file for complete search history.

(56) References Cited

U.S. PATENT DOCUMENTS

| | | | | |
|---|---|---|---|---|
| 4,537,092 A | * | 8/1985 | Morisawa ................ | F16H 3/66 475/285 |
| 4,594,914 A | * | 6/1986 | Kubo ........................ | F16H 3/66 475/285 |
| 4,624,154 A | * | 11/1986 | Kraft ......................... | F16H 3/66 475/278 |
| 4,711,138 A | * | 12/1987 | Miura ..................... | F16H 3/663 475/143 |
| 4,716,787 A | * | 1/1988 | Miura ..................... | F16H 3/663 475/146 |
| 4,722,242 A | * | 2/1988 | Miura ..................... | F16H 3/663 475/205 |

(Continued)

FOREIGN PATENT DOCUMENTS

| | | |
|---|---|---|
| JP | H05-288249 A | 11/1993 |
| JP | 2019-049285 A | 3/2019 |

*Primary Examiner* — Dirk Wright
(74) *Attorney, Agent, or Firm* — Oliff PLC

(57) ABSTRACT

An automatic transmission includes: a main transmission including a plurality of main transmission side planetary gear mechanisms; an auxiliary transmission having a rotation axis different from a rotation axis of the main transmission; and a low/high switching mechanism switching between a low mode and a high mode by engaging and disengaging an engaging device provided on the auxiliary transmission. Further, the low/high switching mechanism switches between the low mode and the high mode at a point where a gear ratio in the low mode coincides with a gear ratio in the high mode.

4 Claims, 10 Drawing Sheets

(56) References Cited

U.S. PATENT DOCUMENTS

| | | | | |
|---|---|---|---|---|
| 4,884,472 A * | 12/1989 | Miura | F16H 3/663 | 475/148 |
| 4,914,978 A * | 4/1990 | Moroto | F16H 3/663 | 475/71 |
| 4,916,977 A * | 4/1990 | Aoki | F16H 3/663 | 475/205 |
| 4,933,851 A * | 6/1990 | Ito | B60W 30/18 | 477/102 |
| 4,934,215 A * | 6/1990 | Miura | F16H 3/663 | 475/283 |
| 4,966,264 A * | 10/1990 | Hayakawa | F16H 57/08 | 192/109 R |
| 5,006,102 A * | 4/1991 | Takase | F16H 3/663 | 475/282 |
| 5,203,749 A * | 4/1993 | Ito | B60K 17/06 | 475/204 |
| 5,213,552 A * | 5/1993 | Ito | F16H 3/66 | 475/276 |
| 5,224,907 A * | 7/1993 | Shirataki | F16H 3/66 | 475/205 |
| 5,232,418 A * | 8/1993 | Aoki | F16D 25/0638 | 192/48.61 |
| 5,310,390 A * | 5/1994 | Shirataki | F16H 3/66 | 475/311 |
| 5,354,244 A * | 10/1994 | Shirataki | F16H 3/66 | 475/205 |
| 5,426,991 A * | 6/1995 | Ohkawa | B60K 17/06 | 74/331 |
| 5,431,604 A * | 7/1995 | Marusue | F16H 61/0437 | 475/123 |
| 5,470,284 A * | 11/1995 | Taniguchi | F16H 3/64 | 475/204 |
| 5,569,116 A * | 10/1996 | Jang | F16H 61/0206 | 477/130 |
| 5,584,775 A * | 12/1996 | Miura | F16H 3/66 | 475/200 |
| 5,700,223 A * | 12/1997 | Park | F16H 3/663 | 475/204 |
| 5,769,749 A * | 6/1998 | Funahashi | F16H 3/66 | 475/276 |
| 6,746,359 B2 * | 6/2004 | Kang | F16H 3/66 | 475/276 |
| 6,805,649 B2 * | 10/2004 | Kim | F16H 61/0206 | 475/119 |
| 7,198,586 B2 * | 4/2007 | Brooks | F16H 3/66 | 475/276 |
| 7,311,634 B2 * | 12/2007 | Shim | F16H 3/663 | 475/275 |
| 2019/0078661 A1 | 3/2019 | Asaoka et al. | | |

* cited by examiner

| | 8th 0.67 | 7th 0.80 | 6th 1.00 | 5th 1.24 | 4th 1.49 | 3rd 2.05 | 2nd 3.18 | 1th 5.52 |
|---|---|---|---|---|---|---|---|---|
| Lo | | 1.19 | 1.25 | 1.24 | 1.21 | 1.37 | 1.55 | 1.73 |
| Hi | 1.19 | 1.25 | 1.24 | 1.21 | 1.37 | 1.55 | 1.73 | ← 1.49 → |
| | 8th 0.45 | 7th 0.54 | 6th 0.67 | 5th 0.83 | 4th 1.00 | 3rd 1.37 | 2nd 2.13 | 1th 3.70 |

| GEAR STAGE | ROTATION SPEED RATIO | | | | | | |
| --- | --- | --- | --- | --- | --- | --- | --- |
| | I1 | I2 | I3 | I4 | I5 | I6 | I7 |
| 1st | 1.00 | 1.00 | -0.39 | 0.51 | 0.51 | 0.00 | 0.19 |
| 2nd | 1.00 | 1.00 | 0.00 | 0.51 | 0.51 | 0.22 | 0.33 |
| 3rd | 1.00 | 1.00 | 0.51 | 0.51 | 0.51 | 0.51 | 0.51 |
| 4th | 1.00 | 1.00 | 1.00 | 0.51 | 0.51 | 0.79 | 0.69 |
| 5th | 1.00 | 1.00 | 1.37 | 0.51 | 0.51 | 1.00 | 0.82 |
| 6th | 1.00 | 1.00 | 1.00 | 0.51 | 1.00 | 1.00 | 1.00 |
| 7th | 1.00 | 1.00 | 0.51 | 0.51 | 1.64 | 1.00 | 1.24 |
| 8th | 1.00 | 1.00 | 0.00 | 0.51 | 2.31 | 1.00 | 1.49 |
| Rev | 1.00 | 1.00 | 0.51 | 0.51 | -0.67 | 0.00 | -0.25 |

|  |  | AFTER GEAR SHIFTING | | | | | | | |
| --- | --- | --- | --- | --- | --- | --- | --- | --- | --- |
|  |  | 1st | 2nd | 3rd | 4th | 5th | 6th | 7th | 8th |
| BEFORE GEAR SHIFTING | 1st |  |  |  |  |  |  |  |  |
|  | 2nd | 0.24 |  |  |  |  |  |  |  |
|  | 3rd | 0.24 | 0.24 |  |  |  |  |  |  |
|  | 4th | 0.24 | 0.24 | 0.24 |  |  |  |  |  |
|  | 5th | 0.24 | 0.24 | 0.24 | 0.24 |  |  |  |  |
|  | 6th | 0.21 | 0.21 | 0.21 | 0.25 | 0.54 |  |  |  |
|  | 7th | 0.21 | 0.21 | 0.22 | 0.21 | 0.54 | 0.54 |  |  |
|  | 8th | 0.21 | 0.21 | 0.21 | 0.21 | 0.54 | 0.54 | 0.54 |  |

| | | AFTER GEAR SHIFTING | | | | | | | |
|---|---|---|---|---|---|---|---|---|---|
| | | 1st | 2nd | 3rd | 4th | 5th | 6th | 7th | 8th |
| BEFORE GEAR SHIFTING | 1st | | | | | | | | |
| | 2nd | 0.23 | | | | | | | |
| | 3rd | 0.23 | 0.23 | | | | | | |
| | 4th | 0.23 | 0.23 | 0.23 | | | | | |
| | 5th | 0.23 | 0.23 | 0.23 | 0.23 | | | | |
| | 6th | 0.21 | 0.21 | 0.21 | 0.23 | 0.40 | | | |
| | 7th | 0.21 | 0.21 | 0.21 | 0.21 | 0.40 | 0.40 | | |
| | 8th | 0.21 | 0.21 | 0.21 | 0.21 | 0.40 | 0.40 | 0.40 | |

|  |  |  | AFTER GEAR SHIFTING | | | | | | | |
|---|---|---|---|---|---|---|---|---|---|---|
|  |  |  | 1st (Lo) | 2nd (Lo) | 3rd (Lo) | 4th (Lo) | 5th (Lo) | 4th (Hi) | 5th (Hi) | 6th (Hi) |
|  |  |  | 1st | 2nd | 3rd | 4th | 5th | 6th | 7th | 8th |
| BEFORE GEAR SHIFTING | 1st (Lo) | 1st | | | | | | | | |
| | 2nd (Lo) | 2nd | 0.24 | | | | | | | |
| | 3rd (Lo) | 3rd | 0.24 | 0.24 | | | | | | |
| | 4th (Lo) | 4th | 0.24 | 0.24 | 0.24 | | | | | |
| | 5th (Lo) | 5th | 0.24 | 0.24 | 0.24 | 0.24 | | | | |
| | 4th (Hi) | 6th | 0.21 | 0.21 | 0.21 | 0.25 | 0.24 | | | |
| | 5th (Hi) | 7th | 0.21 | 0.21 | 0.22 | 0.21 | 0.24 | 0.24 | | |
| | 6th (Hi) | 8th | 0.21 | 0.21 | 0.21 | 0.21 | 0.21 | 0.25 | 0.54 | |

FIG. 11

|  |  |  | AFTER GEAR SHIFTING | | | | | | | |
|---|---|---|---|---|---|---|---|---|---|---|
|  |  |  | 1st (Lo) | 2nd (Lo) | 3rd (Lo) | 4th (Lo) | 5th (Lo) | 4th (Hi) | 5th (Hi) | 6th (Hi) |
|  |  |  | 1st | 2nd | 3rd | 4th | 5th | 6th | 7th | 8th |
| BEFORE GEAR SHIFTING | 1st (Lo) | 1st |  |  |  |  |  |  |  |  |
|  | 2nd Lo) | 2nd | 0.23 |  |  |  |  |  |  |  |
|  | 3rd (Lo) | 3rd | 0.23 | 0.23 |  |  |  |  |  |  |
|  | 4th (Lo) | 4th | 0.23 | 0.23 | 0.23 |  |  |  |  |  |
|  | 5th (Lo) | 5th | 0.23 | 0.23 | 0.23 | 0.23 |  |  |  |  |
|  | 4th (Hi) | 6th | 0.21 | 0.21 | 0.21 | 0.23 | 0.23 |  |  |  |
|  | 5th (Hi) | 7th | 0.21 | 0.21 | 0.21 | 0.21 | 0.23 | 0.23 |  |  |
|  | 6th (Hi) | 8th | 0.21 | 0.21 | 0.21 | 0.21 | 0.21 | 0.23 | 0.40 |  |

FIG. 12

AUTOMATIC TRANSMISSION

CROSS-REFERENCE TO RELATED APPLICATION(S)

The present application claims priority to and incorporates by reference the entire contents of Japanese Patent Application No. 2018-048478 filed in Japan on Mar. 15, 2018.

BACKGROUND

The present disclosure relates to an automatic transmission.

In recent years, in order to improve fuel consumption of a vehicle, a multistage transmission is more and more used as a stepped automatic transmission mounted on vehicles. For example, Japanese Laid-open Patent Publication No. H05-288249 discloses an automatic transmission provided with a main transmission including two planetary gear mechanisms and an auxiliary transmission including one planetary gear mechanism on different axes, which forms forward first to sixth gears and a reverse gear by selectively engaging and disengaging frictional engagement elements such as a clutch and a brake.

However, although the automatic transmission disclosed in Japanese Laid-open Patent Publication No. H05-288249 is provided with the auxiliary transmission in order to increase the gear stages while reducing a size in an axial direction, there is a room for improvement in gear shifting time.

SUMMARY

There is a need for solving the problem in the related-art technology.

According to an embodiment, an automatic transmission includes: a main transmission including a plurality of main transmission side planetary gear mechanisms; an auxiliary transmission having a rotation axis different from a rotation axis of the main transmission; and a low/high switching mechanism switching between a low mode and a high mode by engaging and disengaging an engaging device provided on the auxiliary transmission. Further, the low/high switching mechanism switches between the low mode and the high mode at a point where a gear ratio in the low mode coincides with a gear ratio in the high mode.

BRIEF DESCRIPTION OF THE DRAWINGS

FIG. 8 is a table that illustrates a rotation speed ratio of each rotating member in each gear stage of a main transmission of the disclosed embodiments;

FIG. 9 is a table that illustrates a trial calculation result of shift transient inertia in a high-capacity automatic transmission according to a comparative example;

FIG. 10 is a table that illustrates a trial calculation result of shift transient inertia in a middle-capacity automatic transmission according to a comparative example;

FIG. 11 is a table that illustrates a trial calculation result of shift transient inertia in a case of a high-capacity automatic transmission according to the disclosed embodiments; and FIG. 12 is a table that illustrates a trial calculation result of shift transient inertia in a case of a middle-capacity automatic transmission according to the disclosed embodiments.

DETAILED DESCRIPTION

An embodiment of an automatic transmission according to the present disclosure is hereinafter described. Note that, the present disclosure is not limited to this embodiment.

Figure 1:
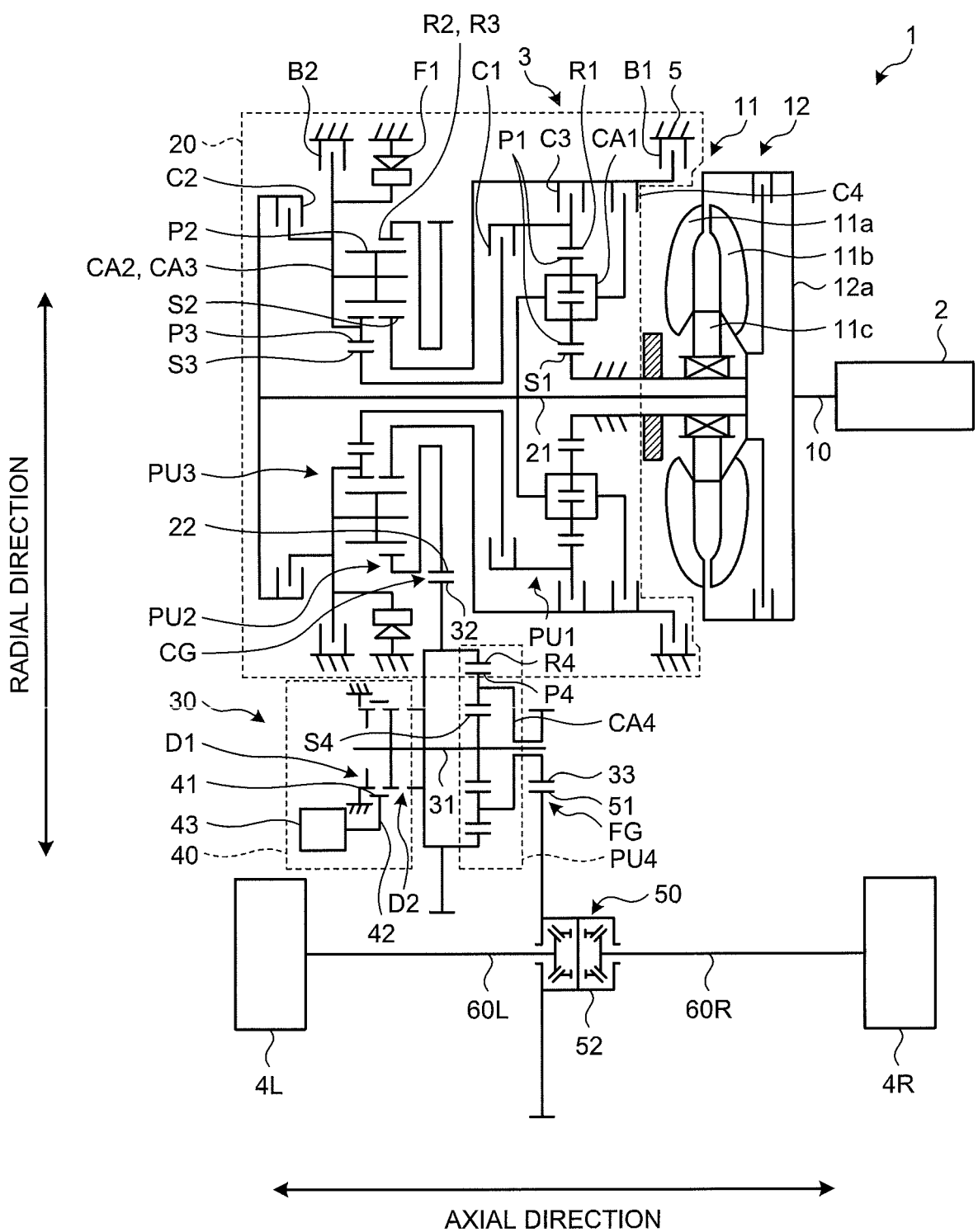
FIG. 1 is a skeleton diagram of a vehicle including an automatic transmission according to an embodiment.

FIG. 1 is a skeleton diagram of a vehicle 1 including an automatic transmission 3 according to the embodiment. The vehicle 1 of this embodiment is a Front engine/Front drive (FF) type and includes an engine 2, the automatic transmission 3, and front wheels 4L and 4R. Note that the vehicle 1 may also be a Rear engine/Rear drive (RR) type.

The automatic transmission 3 includes an input shaft 10, a torque converter 11, a lock-up clutch 12, a main transmission 20, an auxiliary transmission 30, a differential unit 50, and a case 5 which houses them. The input shaft 10 is connected to a crank shaft (not illustrated) of the engine 2. The torque converter 11 includes a pump impeller 11a connected to the input shaft 10, a turbine runner 11b to which rotation of the pump impeller 11a is transmitted via oil as working fluid, and a stator 11c arranged between the pump impeller 11a and the turbine runner 11b rotation of which is restricted to one direction by a one-way clutch (not illustrated). The turbine runner 11b is connected to an input shaft 21 of the main transmission 20 coaxial with the input shaft 10. The lock-up clutch 12 directly engages a front cover 12a with the input shaft 21 by engagement to bring the torque converter 11 into a lock-up state.

The main transmission 20 is a planetary gear multistage automatic transmission in which a plurality of gear stages with different gear ratios is formed by selectively engaging and disengaging first to fourth clutches C1 to C4, first and second brakes B1 and B2, and a one-way clutch F1 which are a plurality of frictional engagement elements. Further, the main transmission 20 includes a double pinion type first planetary gear mechanism PU1, and a single pinion type second planetary gear mechanism PU2 and a double pinion type third planetary gear mechanism PU3 formed into a Ravigneaux type on the same axis, and changes a rotation speed of the input shaft 21 to output from a counter drive gear 22. The counter drive gear 22 is connected to the differential unit 50 via the auxiliary transmission 30.

The first planetary gear mechanism PU1 includes a first sun gear S1 which is an external gear, a first ring gear R1 which is an internal gear arranged concentrically with the first sun gear S1, a first pinion gear P1 formed of a pair of gears meshing with the first sun gear S1 and the first ring gear R1, and a first carrier CA1 which supports the first pinion gear P1 so as to be rotatable and revolvable.

The second planetary gear mechanism PU2 includes a second sun gear S2 which is an external gear, a second ring gear R2 which is an internal gear arranged concentrically with the second sun gear S2, a second pinion gear P2 meshing with the second sun gear S2 and the second ring gear R2, and a second carrier CA2 which supports the second pinion gear P2 so as to be rotatable and revolvable.

The third planetary gear mechanism PU3 includes a third sun gear S3 which is an external gear, a third ring gear R3 which is an internal gear arranged concentrically with the third sun gear S3, a third pinion gear P3 formed of a pair of gears meshing with the third sun gear S3 and the third ring gear R3, and a third carrier CA3 which supports the third pinion gear P3 so as to be rotatable and revolvable.

The first to fourth clutches C1 to C4 and the first and second brakes B1 and B2 which are the frictional engagement elements are formed of wet multiple-disc clutches and brakes pressed by a hydraulic actuator, and band brakes tightened by a hydraulic actuator.

The auxiliary transmission 30 includes a countershaft 31 parallel to the input shaft 21 of the main transmission 20, a counter driven gear 32 which meshes with the counter drive gear 22 of the main transmission 20, a fourth planetary gear mechanism PU4 provided coaxially with the countershaft 31, a low/high switching mechanism 40 which switches between a low (Lo) mode and a high (Hi) mode of the auxiliary transmission 30, and a final drive gear 33. Rotation input from the counter drive gear 22 of the main transmission 20 to the counter driven gear 32 is transmitted to the final drive gear 33 via the countershaft 31 and the fourth planetary gear mechanism PU4. The final drive gear 33 meshes with a final driven gear 51 of the differential unit 50 and the rotation input from the final drive gear 33 to the final driven gear 51 is output to axles 60L and 60R of the front wheels 4L and 4R, respectively, via a differential gear 52.

In the automatic transmission 3 according to the embodiment, by providing the auxiliary transmission 30 on an axis different from that of the main transmission 20, it is possible to shorten a width in an axial direction of the automatic transmission 3 as compared to a case where the main transmission 20 and the auxiliary transmission 30 are coaxially provided.

Figure 2:
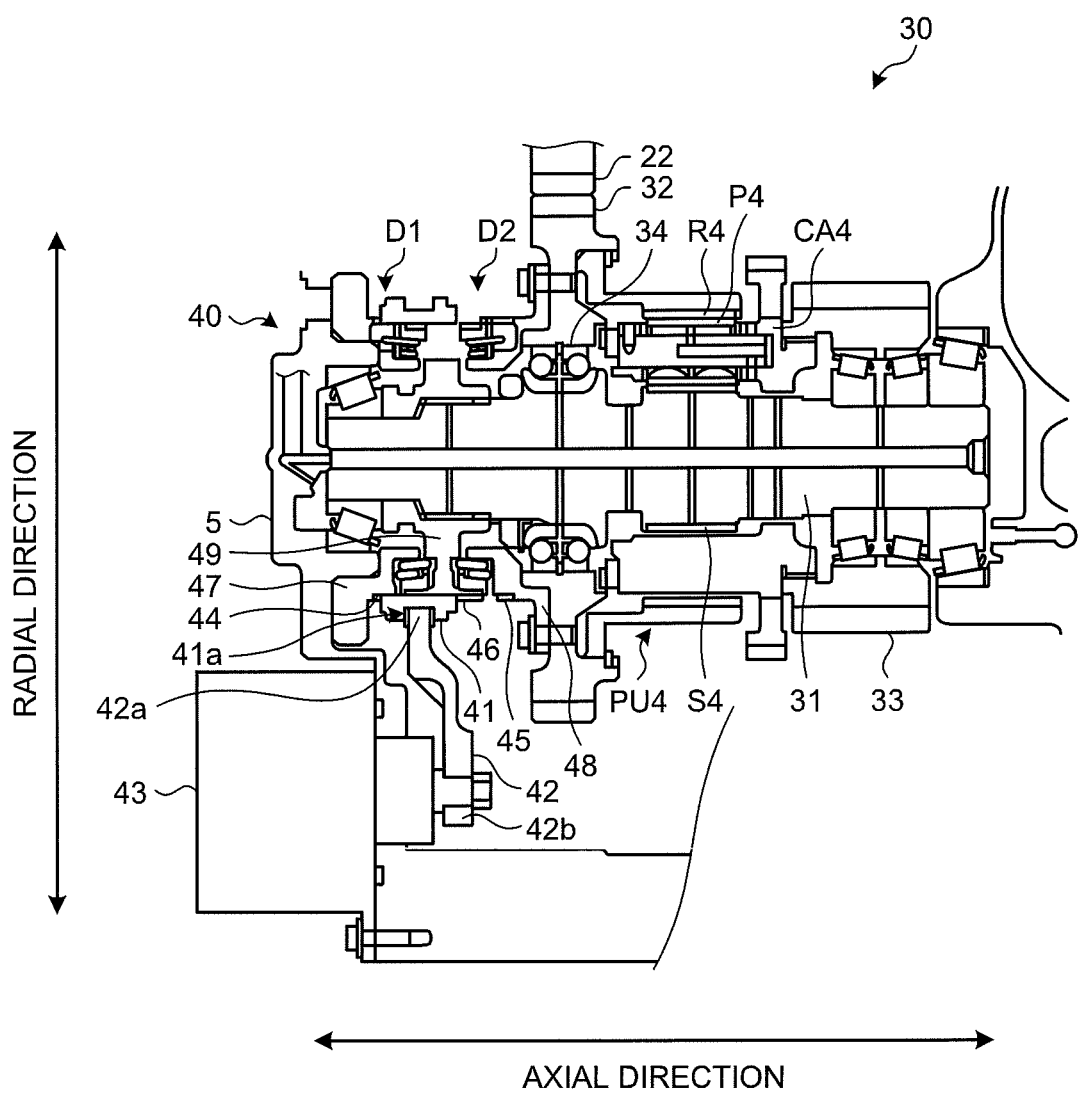
FIG. 2 is an enlarged view of an auxiliary transmission in a low mode.
Figures 3, 4:
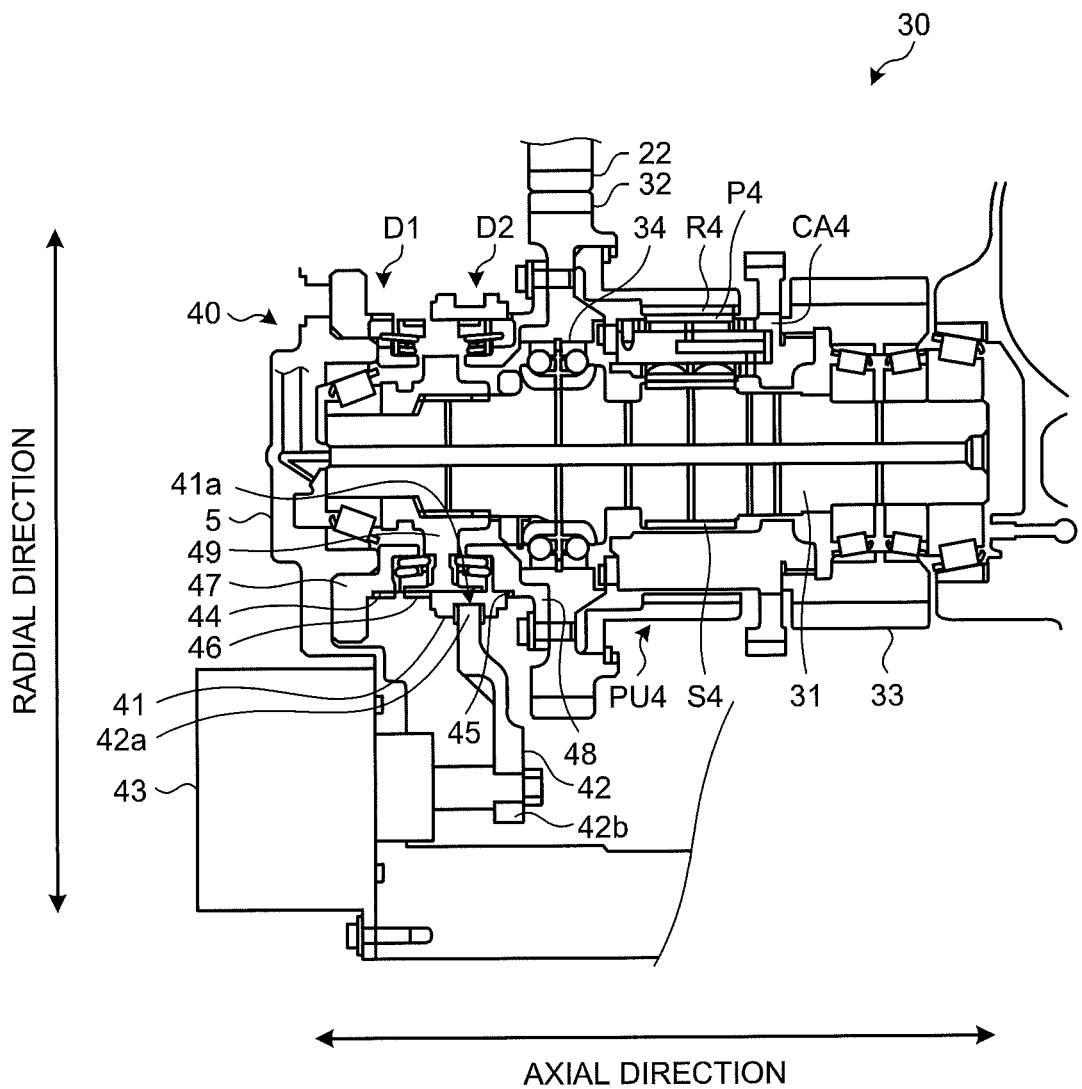
FIG. 3 is an enlarged view of the auxiliary transmission in a high mode.
FIG. 4 is a view illustrating a relationship between a gear ratio of each gear stage in the low mode and the gear ratio of each gear stage in the high mode.

FIG. 2 is an enlarged view of the auxiliary transmission 30 in the low mode. FIG. 3 is an enlarged view of the auxiliary transmission 30 in the high mode. As illustrated in FIGS. 2 and 3, the fourth planetary gear mechanism PU4 forming the auxiliary transmission 30 includes a fourth sun gear S4, a fourth ring gear R4 which is an internal gear arranged concentrically with the fourth sun gear S4, a fourth pinion gear P4 formed of a pair of gears meshing with the fourth sun gear S4 and the fourth ring gear R4, and a fourth carrier CA4 which supports the fourth pinion gear P4 so as to be rotatable and revolvable. Further, the counter driven gear 32 is provided on an outer peripheral surface of the fourth ring gear R4.

The fourth sun gear S4 is an external gear formed by directly cutting teeth on an outer peripheral surface of the countershaft 31. By forming the fourth sun gear S4 by directly cutting the teeth on the outer peripheral surface of the countershaft 31, an outer diameter of the fourth sun gear S4 may be made smaller than that in a case where the fourth sun gear S4 is provided separately from the countershaft 31. As a result, as the outer diameter of the fourth sun gear S4 decreases, the fourth planetary gear mechanism PU4 may be made smaller in a radial direction, and the auxiliary transmission 30 may be made smaller in a radial direction. Therefore, it is possible to make the automatic transmission 3 compact accordingly.

In the automatic transmission 3 according to the embodiment, as illustrated in FIG. 1, the fourth planetary gear mechanism PU4 of the auxiliary transmission 30 is provided between the first planetary gear mechanism PU1 and the second planetary gear mechanism PU2 adjacent to each other in an axial direction of the main transmission 20 such that a part thereof is located in the main transmission 20 in the radial direction. As a result, the first planetary gear mechanism PU1, the second planetary gear mechanism PU2 or the third planetary gear mechanism PU3 of the main transmission 20 overlaps with the fourth planetary gear mechanism PU4 of the auxiliary transmission 30 in the radial direction, and the auxiliary transmission 30 may be made smaller in the radial direction than in a case where a part of the fourth planetary gear mechanism PU4 is not located in the main transmission 20 in the radial direction. Therefore, it is possible to make the automatic transmission 3 compact accordingly.

Further, the fourth planetary gear mechanism PU4 is located between a counter gear pair CG formed of the counter drive gear 22 and the counter driven gear 32 for transmitting power between the main transmission 20 and the auxiliary transmission 30 and a final gear pair FG formed of the final drive gear 33 and the final driven gear 51 for transmitting power between the auxiliary transmission 30 and the differential unit 50 in an axial direction of the auxiliary transmission 30. As a result, it is possible to make a space of a power transmission path from the counter gear pair CG to the final gear pair FG via the fourth planetary gear mechanism PU4 compact.

An end of the counter driven gear 32 on a side opposite to the side of the counter drive gear 22 in a radial direction is in contact with an outer peripheral surface of a bearing 34 which rotatably supports the countershaft 31. As a result, the bearing 34 may receive a force in the radial direction applied to the counter driven gear 32 when the rotation is transmitted from the counter drive gear 22. Therefore, it is possible to suppress a power transmission loss due to inclination of the counter driven gear 32 with respect to an axial direction thereof.

The low/high switching mechanism 40 includes a first dog clutch D1, a second dog clutch D2, and an electric actuator 43 and switches between the low mode and the high mode of the auxiliary transmission 30. Although a case is described where the electric actuator 43 is provided on an axis different from that of the countershaft 31 of the auxiliary transmission 30, which is an auxiliary axis, thereby reducing the size in the axial direction of the auxiliary transmission 30, note that the position in which the electric actuator 43 is provided is not limited to this. For example, the electric actuator 43 may be coaxially provided with the countershaft 31.

The first dog clutch D1 includes a clutch sleeve 41, a shift fork 42, a first dog tooth 44, and a third dog tooth 46.

The first dog tooth 44 is connected to the case 5 via a support member 47. The first dog tooth 44 is an external tooth projecting outward in a radial direction thereof, and a direction in which a tooth trace extends is a countershaft axial direction. The first dog tooth 44 and the third dog tooth 46 are adjacent to each other such that the first dog tooth 44 is located on a side opposite to the side of the fourth planetary gear mechanism PU4 in the countershaft axial direction with respect to the third dog tooth 46, the side faces thereof are opposed to each other, and outer diameters thereof are equal.

The third dog tooth 46 is connected to the countershaft 31 via a support member 49. The third dog tooth 46 is an external tooth projecting outward in a radial direction thereof, and a direction in which a tooth trace extends is the countershaft axial direction.

The clutch sleeve 41 includes a fourth dog tooth (not illustrated) which meshes with the first dog tooth 44 and the third dog tooth 46. The fourth dog tooth is an internal tooth arranged on an inner periphery of the clutch sleeve 41 and a direction in which a tooth trace extends is the countershaft axial direction. On an outer peripheral surface of the clutch sleeve 41, a groove portion 41a in which a distal end 42a of the shift fork 42, a base end 42b side of the shift fork 42 is fixed to a shaft of the electric actuator 43, slidably fits is provided in the circumferential direction. Then, the clutch sleeve 41 moves in the countershaft axial direction via the shift fork 42 by a driving force applied from the electric actuator 43.

The first dog clutch D1 can be switched between an engaged state in which the fourth dog tooth of the clutch sleeve 41 meshes with the first dog tooth 44 and the third dog tooth 46 and a disengaged state in which the fourth dog tooth meshes with the third dog tooth 46 but does not mesh with the first dog tooth 44. When the first dog clutch D1 is in the engaged state, the fourth sun gear S4 provided on the countershaft 31 is non-rotatably fixed and differential rotation of the fourth ring gear R4 and the fourth carrier CA4 is allowed. As a result, the fourth planetary gear mechanism PU4 is put into a decelerating state in which input rotation of the fourth ring gear R4 is decelerated to be transmitted to the fourth carrier CA4 and output to the final drive gear 33 as illustrated in a collinear chart in FIG. 4.

The second dog clutch D2 includes the clutch sleeve 41, the shift fork 42, and the third dog tooth 46 shared by the first dog clutch D1, and a second dog tooth 45.

The second dog tooth 45 is connected to the fourth ring gear R4 via a support member 48. The second dog tooth 45 is an external tooth projecting outward in a radial direction thereof, and a direction in which a tooth trace extends is the countershaft axial direction. The second dog tooth 45 faces the first dog tooth 44 across the first dog tooth 44 in the countershaft axial direction. The second dog tooth 45 and the third dog tooth 46 are adjacent to each other in the countershaft axial direction, the side faces thereof are opposed to each other, and outer diameters thereof are equal.

The second dog clutch D2 may be switched between an engaged state in which the fourth dog tooth of the clutch sleeve 41 meshes with the second dog tooth 45 and the third dog tooth 46 and a disengaged state in which the fourth dog tooth meshes with the third dog tooth 46 but does not mesh with the second dog tooth 45. When the second dog clutch D2 is in the engaged state, the fourth sun gear S4 and the fourth ring gear R4 provided on the countershaft 31 are connected to each other and the fourth ring gear R4, the fourth sun gear S4, and the fourth carrier CA4 rotate integrally. As a result, the fourth planetary gear mechanism PU4 is put into a directly connected state in which the input rotation of the fourth ring gear R4 is transmitted to the fourth carrier CA4 at the equal speed and output to the final drive gear 33.

The low/high switching mechanism 40 moves the shift fork 42 by the electric actuator 43 to put the first dog clutch D1 into the engaged state and put the second dog clutch D2 into the disengaged state, thereby switching the auxiliary transmission 30 to the low mode. Further, the low/high switching mechanism 40 moves the shift fork 42 by the electric actuator 43 to put the first dog clutch D1 into the disengaged state and put the second dog clutch D2 into the engaged state, thereby switching the auxiliary transmission 30 to the high mode. Note that the electric actuator 43 may move the shift fork 42 by energizing and stop the energization to maintain the position of the shift fork 42. Therefore, when maintaining the shift fork 42 in a position where the first dog clutch D1 or the second dog clutch D2 is put into the engaged state, the electric actuator 43 is not energized, so that it is possible to save energy.

Further, the low/high switching mechanism 40 switches between the low mode and the high mode of the auxiliary transmission 30 by the first and second dog clutches D1 and D2 being meshing clutches. This makes it possible to suppress a drag loss which might occur in a case where the clutch for switching between the low mode and the high mode of the auxiliary transmission 30 is formed of a frictional engagement element.

In the automatic transmission 3 according to the embodiment, the engagement and disengagement of the first to fourth clutches C1 to C4, the first and second brakes B1 and B2, and the first and second dog clutches D1 and D2 are controlled, so that forward gears of first to eighth and a reverse gear of Rev are formed as the gear stages of an entire automatic transmission 3 as illustrated in an engagement table in following Table 1 according to accelerator operation by a driver, and a vehicle speed. Note that, in the engagement table in following Table 1, "○" indicates engagement and "–" indicates disengagement. In addition, first (Lo) to sixth (Lo) are the low modes indicating that the main transmission 20 is in the forward first to sixth gears. In addition, fourth (Hi) to sixth (Hi) are the high modes indicating that the main transmission 20 is in the forward fourth to sixth gears.

TABLE 1

| GEAR STAGE | | CLUTCH | | | | BRAKE | | DOG CLUTCH | |
|---|---|---|---|---|---|---|---|---|---|
| | | C1 | C2 | C3 | C4 | B1 | B2 | D1 | D2 |
| 1st (Lo) | 1st | ○ | — | — | — | — | ○ | ○ | — |
| 2nd (Lo) | 2nd | ○ | — | — | — | ○ | — | ○ | — |
| 3rd (Lo) | 3rd | ○ | — | ○ | — | — | — | ○ | — |
| 4th (Lo) | 4th | ○ | — | — | ○ | — | — | ○ | — |
| 5th (Lo) | 5th | ○ | ○ | — | — | — | — | ○ | — |
| 6th (Lo) | 6th | — | ○ | — | ○ | — | — | ○ | — |
| 4th (Hi) | | ○ | — | — | ○ | — | — | — | ○ |
| 5th (Hi) | 7th | ○ | ○ | — | — | — | — | — | ○ |
| 6th (Hi) | 8th | — | ○ | — | ○ | — | — | — | ○ |
| Rev | | — | — | ○ | — | — | ○ | ○ | — |

Note that, in the automatic transmission 3 according to the embodiment, as illustrated in an engagement table in following Table 2, the engagement and the disengagement of the first to fourth clutches C1 to C4 and the first and second brakes B1 and B2 are controlled, so that the main transmission 20 can form the forward first to eighth gears and the reverse gear in accordance with the accelerator operation of the driver, the vehicle speed and the like.

TABLE 2

| GEAR STAGE | CLUTCH | | | | BRAKE | |
| --- | --- | --- | --- | --- | --- | --- |
| | C1 | C2 | C3 | C4 | B1 | B2 |
| 1st | ○ | — | — | — | — | ○ |
| 2nd | ○ | — | — | — | ○ | — |
| 3rd | ○ | — | ○ | — | — | — |
| 4th | ○ | — | — | ○ | — | — |
| 5th | ○ | ○ | — | — | — | — |
| 6th | — | ○ | — | ○ | — | — |
| 7th | — | ○ | ○ | — | — | — |
| 8th | — | ○ | — | — | ○ | — |
| Rev | — | — | ○ | — | — | ○ |

Therefore, in the automatic transmission 3 according to the embodiment, by switching between the low mode and the high mode of the auxiliary transmission 30 by the low/high switching mechanism 40, it is possible to form the forward first to eighth gears in the low mode and form the forward first to eighth gears in the high mode. Note that a low/high required ratio of the fourth planetary gear mechanism PU4 provided in the auxiliary transmission 30 is set such that the gear ratio of the forward eighth gear in the low mode coincides with the gear ratio of the forward sixth gear in the high mode. In the automatic transmission 3 according to the embodiment, among the gear stages which can be formed, first to eighth are formed as the gear stages of the entire automatic transmission 3 by using the forward first to sixth gears in the low mode and the forward fourth to sixth gears in the high mode.

Specifically, as illustrated in the engagement table in Table 1 above, when the auxiliary transmission 30 is in the low mode and the main transmission 20 is in the forward first to sixth gears (1st (Lo) to 6th (Lo)), first to sixth are formed as the gear stages of the entire automatic transmission 3. When the auxiliary transmission 30 is in the high mode and the main transmission 20 is in the forward fourth to sixth gears (4th (Hi) to 6th (Hi)), sixth to eighth are formed as the gear stages of the entire automatic transmission 3.

FIG. 4 is a view illustrating a relationship between the gear ratio of each gear stage in the low mode and the gear ratio of each gear stage in the high mode. In the automatic transmission 3 according to the embodiment, the low/high switching mechanism 40 switches between the low mode and the high mode at a point where the gear ratio in the low mode coincides with the gear ratio in the high mode. Specifically, as illustrated in FIG. 4, the gear ratio of the forward sixth gear in the low mode (Lo side 6th) coincides with the gear ratio of the forward fourth gear in the high mode (Hi side 4th) at 1.00. Then, at the forward sixth gear in the low mode (Lo side 6th) and the forward fourth gear in the high mode (Hi side 4th) at which the gear ratios coincide, the low mode and the high mode are switched.

For example, in a case of upshifting the gear stage of the entire automatic transmission 3 from fifth to sixth, after upshifting from the forward fifth gear in the low mode to the forward sixth gear in the low mode, it is switched from the forward sixth gear in the low mode to the forward fourth gear in the high mode, thereby forming sixth as the gear stage of the entire automatic transmission 3. Thereafter, in a case of upshifting the gear stage of the entire automatic transmission 3 from sixth to seventh, it is upshifted from the forward fourth gear in the high mode to the forward fifth gear in the high mode, thereby forming seventh as the gear stage of the entire automatic transmission 3.

On the other hand, in a case of downshifting the gear stage of the entire automatic transmission 3 from seventh to sixth, after downshifting from the forward fifth gear in the high mode to the forward fourth gear in the high mode, it is switched from the forward fourth gear in the high mode to the forward sixth gear in the low mode, thereby forming sixth as the gear stage of the entire automatic transmission 3. Thereafter, in a case of downshifting the gear stage of the entire automatic transmission 3 from sixth to fifth, it is downshifted from the forward sixth gear in the low mode to the forward fifth gear in the low mode, thereby forming fifth as the gear stage of the entire automatic transmission 3.

Further, since the low/high required ratio of the fourth planetary gear mechanism PU4 provided in the auxiliary transmission 30 is 0.90 to 1.50, it is possible to configure such that the fourth planetary gear mechanism PU4 can be made small. Therefore, in the automatic transmission 3 according to the embodiment, as illustrated in FIG. 4, the low/high required ratio of the fourth planetary gear mechanism PU4 is set to 1.49, thereby making the fourth planetary gear mechanism PU4 small, and eventually making the automatic transmission 3 small.

Figure 5:
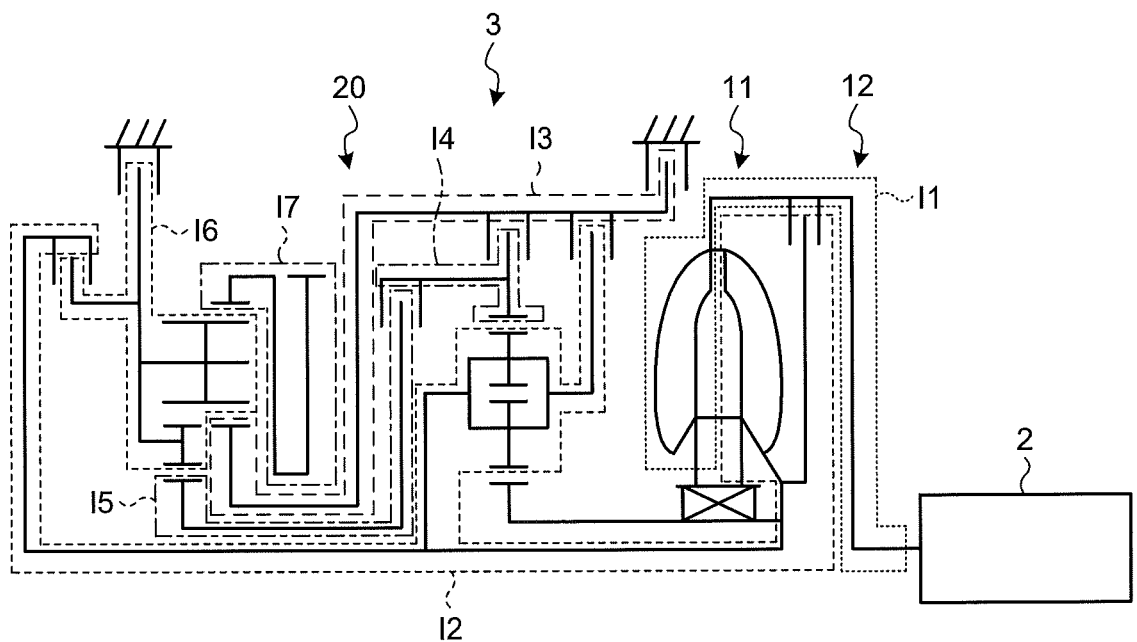
FIG. 5 is a view illustrating a main part of a gear train on a main transmission side of the automatic transmission of FIG. 1.
Figure 6:
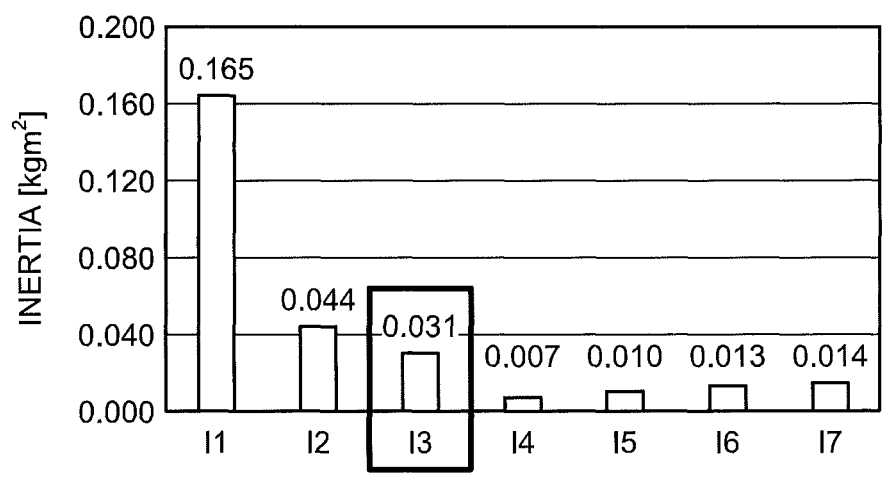
FIG. 6 is a graph illustrating inertia of each rotating member in a high-capacity eight-speed automatic transmission.
Figure 7:
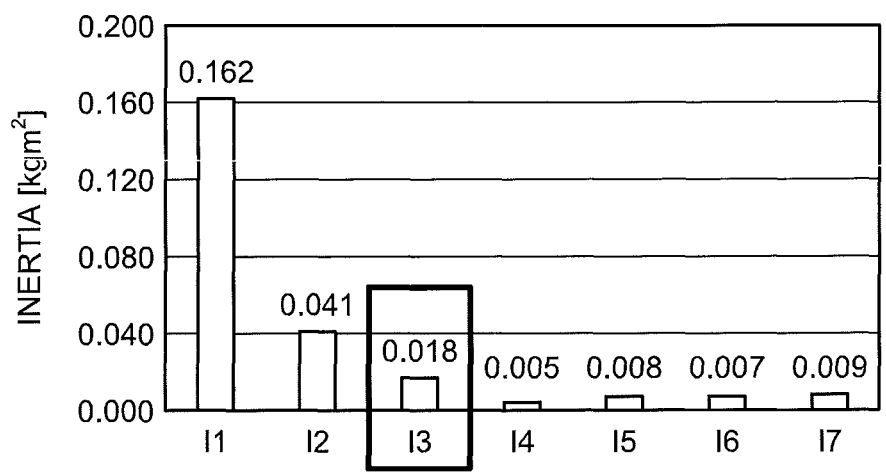
FIG. 7 is a graph illustrating inertia of each rotating member in a medium-capacity eight-speed automatic transmission.

FIG. 5 is a view illustrating a main part of a gear train on the main transmission 20 side of the automatic transmission 3 of FIG. 1. Note that, in FIG. 5, in order to make the drawing easier to see, reference signs of the components assigned in FIG. 1 are properly omitted. FIG. 6 is a graph illustrating inertia of each rotating member in the high-capacity eight-speed automatic transmission 3. FIG. 7 is a graph illustrating inertia of each rotating member in the medium-capacity eight-speed automatic transmission 3.

As a means for improving responsiveness of the automatic transmission 3, the inertia of each rotating body forming the automatic transmission 3 is reduced. As illustrated in FIG. 5, each rotating body forming the gear train on the main transmission 20 side of the automatic transmission 3 may be divided into seven rotating members I1 to I7. The inertia of each rotating member is, for example, as illustrated in a graph in FIG. 6 for the high-capacity automatic transmission 3, and as illustrated in a graph in FIG. 7 for the middle-capacity automatic transmission 3

Note that the rotating member I1 includes the input shaft 10, the pump impeller 11a, and the front cover 12a connected to the crankshaft of the engine 2, and that the rotating member I2 includes the turbine runner 11b of the torque converter 11, and the input shaft 21 of the main transmission 20. Therefore, as can be understood from FIGS. 6 and 7, the inertia of the rotating members I1 and I2 is significantly greater than the inertia of each rotating member I3 to I7 including a rotating body mainly forming the main transmission 20. On the other hand, comparing the inertia of each rotating member I3 to I7, as can be understood from FIGS. 6 and 7, the inertia of the rotating member I3 is especially greater than the inertia of each rotating member I4 to I7. Therefore, the responsiveness in gear shifting in which a rotation change of the rotating member I3 occurs is disadvantageous to the responsiveness in gear shifting in which a rotation change of another rotating member occurs.

FIG. 8 is a table that illustrates a rotation speed ratio of each rotating member in each gear stage of the main transmission 20.

As illustrated in FIG. 8, it is understood that in the rotating member I3, change in the rotation speed ratio is large in the gear shifting from eighth and seventh ((1) in FIG. 8). It is also understood that in the rotating member I5, change in the rotation speed ratio is large in the gear shifting from sixth ((2) in FIG. 8).

FIG. 9 is a table that illustrates a trial calculation result of shift transient inertia in a high-capacity automatic transmission according to a comparative example calculated using following equation (1). FIG. 10 is a table that illustrates a trial calculation result of the shift transient inertia in a middle-capacity automatic transmission according to the comparative example calculated using following equation (1).

Note that, as compared to the automatic transmission 3 according to the embodiment, the automatic transmission according to the comparative example includes the main transmission 20 but does not include the auxiliary transmission 30 and the low/high switching mechanism 40. Therefore, by setting the main transmission 20 to the forward first to eighth gears based on the engagement table of Table 2 above, the gear stages of first to eighth as the entire automatic transmission according to the comparative example are formed. Also, in FIGS. 9 and 10, the boxes, in which the figures are underlined, indicate the gear stages in which the gear shifting can be performed by changing any one of the engagement elements that are the first to fourth clutches C1 to C4 and the first and second brakes B1 and B2.

$$I_{sft\_eq} = I_{E/G} + I_{T/C} + \sum \left( \frac{\omega_{i\_aft} - \omega_{i\_bfr}}{\omega_{in\_aft} - \omega_{in\_bfr}} \right)^2 \cdot I_i \quad (1)$$

In equation (1) above, $I_{sft\_eq}$ represents the shift transient inertia, $I_{E/G}$ represents the inertia of the engine 2, $I_{T/C}$ represents the inertia of the torque converter 11, $I_i$ represents single inertia of the planetary gear member, $\omega_{i\_bfr}$ represents rotation of the planetary gear element before gear shifting, $\omega_{i\_aft}$ represents rotation of the planetary gear element after gear shifting, and $\omega_{in}$ represents rotation of the input shaft 21.

As illustrated in FIGS. 9 and 10, in the automatic transmission according to the comparative example, the shift transient inertia becomes great in the gear shifting from eighth and seventh to sixth and fifth ((1) in FIGS. 9 and 10), and the shift transient inertia also becomes great in the gear shifting from sixth to fifth ((2) in FIGS. 9 and 10). In this manner, in the automatic transmission according to the comparative example, the inertia generated during the gear shifting of the main transmission 20 on a high-speed gear stage side is great, so that gear shifting responsiveness in the gear shifting on the high-speed gear stage side is disadvantageous as compared to that on the low-speed gear stage side.

FIG. 11 is a table that illustrates a trial calculation result of the shift transient inertia in a case where the automatic transmission 3 according to the embodiment is the high-capacity calculated using equation (1) described above. FIG. 12 is a table that illustrates a trial calculation result of the shift transient inertia in a case where the automatic transmission 3 according to the embodiment is the middle-capacity calculated using equation (1) described above.

In the automatic transmission 3 according to the embodiment, as described above, by switching between the low mode and the high mode at the forward sixth gear in the low mode and the forward fourth gear in the high mode with the same gear ratio, the shift transient inertia becomes small in the gear shifting from eighth and seventh to sixth and fifth, and the shift transient inertia also becomes small in the gear shifting from sixth to fifth as illustrated in FIGS. 11 and 12. That is, as in the automatic transmission 3 according to the embodiment, by forming the high-speed gear stage side of the high mode of the auxiliary transmission 30, it is possible to reduce the shift transient inertia at the time of kickdown acceleration on the high-speed gear stage side by approximately half that of the automatic transmission according to the comparative example. Therefore, in the automatic transmission 3 according to the embodiment, it is possible to reduce the inertia generated during the gear shifting of the main transmission 20 on the high-speed gear stage side, so that the gear shifting responsiveness is improved and a gear shifting time may be shortened.

According to an embodiment, it becomes possible to suppress an increase in size of the auxiliary transmission side planetary gear mechanism and make the automatic transmission compact.

According to an embodiment, it becomes possible to reduce inertia generated during gear shifting of the main transmission without changing an existing gear train such as the main transmission.

According to an embodiment, it becomes possible to reduce the inertia generated during the gear shifting of the main transmission on a high-speed gear stage side.

The automatic transmission according to the present disclosure can reduce the inertia generated during the gear shifting of the main transmission by switching between the low mode and the high mode at a point where the gear ratio in the low mode coincides with the gear ratio in the high mode, so that there is an effect that gear shifting responsiveness is improved and a gear shifting time is shortened.

Although the disclosure has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic transmission comprising:
   a main transmission including a plurality of main transmission side planetary gear mechanisms;
   an auxiliary transmission having a rotation axis different from a rotation axis of the main transmission; and
   a low/high switching mechanism configured to switch between a low mode and a high mode by engaging and disengaging an engaging device provided on the auxiliary transmission,
   wherein the low/high switching mechanism is configured to switch between the low mode and the high mode at a point where a gear ratio in the low mode coincides with a gear ratio in the high mode.

2. The automatic transmission according to claim 1,
   wherein the auxiliary transmission includes an auxiliary transmission side planetary gear mechanism which inputs power from the main transmission to a ring gear and outputs the power from a carrier, and a first clutch which fixes a rotation of a sun gear of the auxiliary transmission side planetary gear mechanism and a second clutch which connects the ring gear to the sun gear, the clutches forming the engaging device, and
   the low/high switching mechanism is configured to selectively engage and disengage the first clutch and the second clutch to switch between the low mode and the high mode.

3. The automatic transmission according to claim 1,
   wherein the main transmission includes a forward first gear, a forward second gear, a forward third gear, a forward fourth gear, a forward fifth gear, a forward sixth gear, a forward seventh gear, and a forward eighth gear, and a gear ratio of the forward eighth gear in the low mode coincides with a gear ratio of the forward sixth gear in the high mode.

4. The automatic transmission according to claim 3,
wherein the automatic transmission has first to eighth gear stages can be formed as the gear stages of an entire automatic transmission, first to sixth gear stages are formed as the gear stages of the entire automatic transmission when the auxiliary transmission is in the low mode and the main transmission is in the forward first gear to the forward sixth gear, sixth to eighth gear stages are formed as the gear stages of the entire automatic transmission when the auxiliary transmission is in the high mode and the main transmission is in the forward fourth gear to the forward sixth gear, a gear ratio of the forward sixth gear in the low mode coincides with a gear ratio of the forward fourth gear in the high mode, and the low mode and the high mode are switched at the forward sixth gear in the low mode and the forward fourth gear in the high mode, and in a case of upshifting the gear stage of the entire automatic transmission from the fifth gear stage to the sixth gear stage, after upshifting from the forward fifth gear in the low mode to the forward sixth gear in the low mode, it is switched from the forward sixth gear in the low mode to the forward fourth gear in the high mode to form the sixth gear stage as the gear stage of the entire automatic transmission, and thereafter, in a case of upshifting the gear stage of the entire automatic transmission from the sixth gear state to the seventh gear state, it is upshifted from the forward fourth gear in the high mode to the forward fifth gear in the high mode.

* * * * *

UNITED STATES PATENT AND TRADEMARK OFFICE
CERTIFICATE OF CORRECTION

PATENT NO.        : 10,800,255 B2
APPLICATION NO.   : 16/287173
DATED             : October 13, 2020
INVENTOR(S)       : Hironori Asaoka et al.

Page 1 of 1

It is certified that error appears in the above-identified patent and that said Letters Patent is hereby corrected as shown below:

On the Title Page

In Item (73):
"JISOSHA" should read --JIDOSHA--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*